United States Patent [19]

Miyai et al.

[11] Patent Number: 5,139,319
[45] Date of Patent: Aug. 18, 1992

[54] EXTERIOR STRUCTURE FOR CABINET

[75] Inventors: Hiroyuki Miyai, Matsubara; Mutsuo Yamaguchi, Osaka; Kazutoshi Zushi, Hirakata; Tetsushiro Sueyoshi, Higashiosaka, all of Japan

[73] Assignee: Sanyo Electric Co., Ltd., Moriguchi, Japan

[21] Appl. No.: 645,310

[22] Filed: Jan. 24, 1991

Related U.S. Application Data

[63] Continuation of Ser. No. 382,941, Jul. 21, 1989, abandoned.

[30] Foreign Application Priority Data

Jul. 22, 1988 [JP] Japan .................... 63-183962
May 23, 1989 [JP] Japan .................... 1-59542[U]

[51] Int. Cl.⁵ ............................................. A47B 88/00
[52] U.S. Cl. .................................. 312/7.1; 312/265.6
[58] Field of Search .................... 312/265.6, 7.1, 7.2; 381/88; 220/327

[56] References Cited

U.S. PATENT DOCUMENTS

| 2,557,244 | 6/1951 | Zelov ................................. 312/7.1 |
| 3,924,733 | 12/1975 | DeLong ............................. 220/327 |
| 4,811,403 | 3/1989 | Henricksen et al. ............. 381/88 X |
| 4,843,624 | 6/1989 | Rashak ............................ 381/88 X |

FOREIGN PATENT DOCUMENTS

| 424971 | 1/1958 | Belgium . |
| 7201262 | 4/1972 | Fed. Rep. of Germany . |
| 2408269 | 6/1979 | France . |
| 61-76488 | 5/1986 | Japan . |
| 438419 | 4/1938 | United Kingdom . |

*Primary Examiner*—Joseph Falk
*Attorney, Agent, or Firm*—Armstrong, Nikaido, Marmelstein, Kubovcik & Murray

[57] ABSTRACT

A plurality of facing members are removably attached to respective surface segments formed on the outer surface of a cabinet and identical in shape, interchangeably with respect to the position of attachment. Each of the surface segments extends over a plurality of cabinet faces forming corners of the cabinet. Each of the facing members comprises a plurality of panel portions in conformity with the shape of the surface segment.

9 Claims, 12 Drawing Sheets

FIG. 3
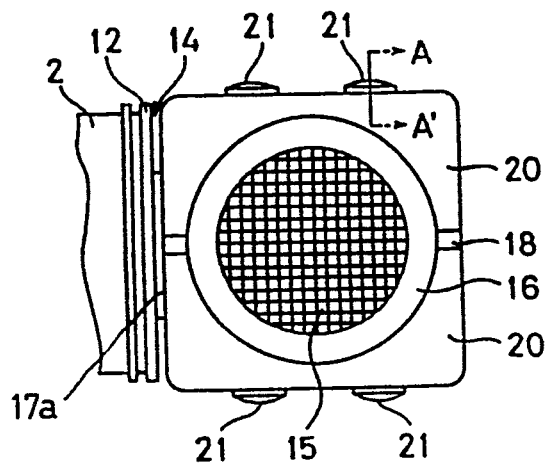
FIG. 4
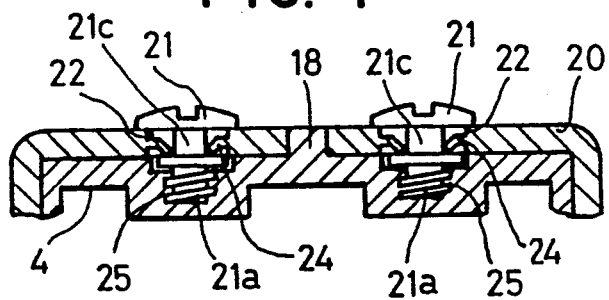
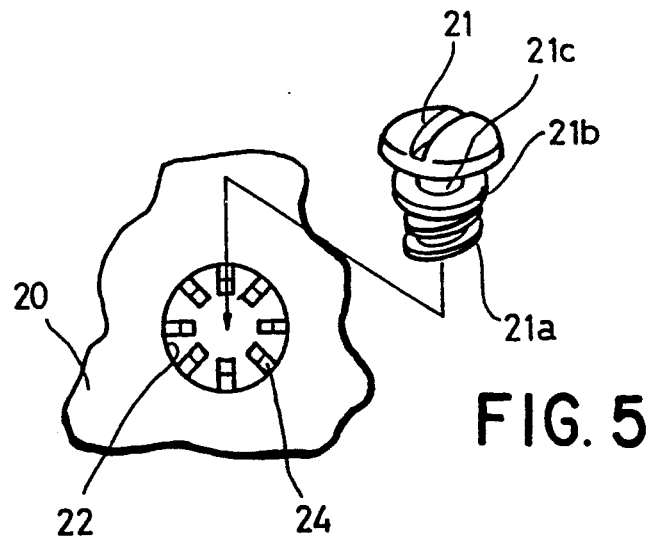
FIG. 5

EXTERIOR STRUCTURE FOR CABINET

This application is a continuation of application Ser. No. 382,941, filed Jul. 21, 1989 now abandoned.

FIELD OF THE INVENTION

The present invention relates to cabinet structures for various devices such as cassette tape playback devices, radio receivers and telephones, and more particularly to an exterior structure for cabinets which comprises a plurality of facing members removably attached to the cabinet and covering the outer surface thereof.

BACKGROUND OF THE INVENTION

The cabinets of various devices such as cassette tape playback devices are generally unremovably fixed to the body of the device. Manufacturers offer devices of the same type with cabinets of different colors to meet the taste of their customers.

Users of household devices, especially of cassette tape playback devices and like household acoustic devices or telephones and like household communication devices, are fashion-oriented in recent years. Furthermore, these devices are used by infants or children more frequently than before. It is therefore desired that such devices have safety and provide amusement as toys.

Unexamined Japanese Patent Publication SHO 61-76488 discloses a panel structure for electronic keyboard musical instruments. With reference to FIG. 17, the disclosed panel structure comprises a plurality of flat panels 82, 83, 84 and 85 which are different in shape and size and attached removably to specified portions of the surface of a cabinet 86. Each panel bears a picture 87, 88 or 89 printed on its surface.

The manufacturer prepares and places on sale some kinds of panels with different picture patterns for each shape or size of panel.

Accordingly, the user can select panels of the desired picture pattern when purchasing the musical instrument and thereafter replace the panels by those of different picture pattern additionally purchased.

With the panel structure described, however, the panels differ in shape and are attached to the body of the device at the respective specified positions, so that the panels already attached to the device body can not be replaced by one another for attachment in the specified positions.

Consequently, if it is desired to replace the panels on the device purchased by those of a different picture pattern to give an altered appearance to the device, there arises a need to purchase the desired panels separately sold. It is therefore impossible to change the panels as desired to alter the appearance of the device for amusement.

Further as seen in FIG. 17, the corner of the cabinet 86 has a guide member 90 attached thereto for holding the adjacent panels, so that if the panel structure is used for a device, such as a cassette tape playback device, which is usable even by infants, the sharp edge 91, 92 or 93 of the guide member is likely to injure the infant. Even in the case where fastening means such as screws which are shaped to assure safety are used, flat panels arranged at a right angle with one another in combination to form two or three faces intersecting one another at a right angle form a sharp projection at the intersection. The projection is also likely to cause injuries to the infant, hence the problem of poor safety.

SUMMARY OF THE INVENTION

An object of the present invention is to provide an exterior structure for the cabinet of a device which structure comprises a plurality of facing members removably attached to the exterior surface of the cabinet, the facing members being identical in configuration and interchangeable in the position of attachment to the cabinet.

Another object of the invention is to provide an exterior structure of the type stated above wherein each of the facing members can be removably attached to the cabinet with corners of the cabinet thereby covered and without forming any sharp projection or the like at the corner of the device.

The exterior structure of the present invention has a plurality of surface segments formed on the surface of a rectangular parallelepipedal cabinet, a plurality of facing members for covering the respective surface segments, and fastening means for removably attaching each of the facing members to the desired one of the surface segments.

Each of the surface segments is formed over a plurality of cabinet faces intersecting one another approximately at a right angle to form corners of the cabinet. The surface segments are identical in three-dimensional configuration.

Each of the facing members comprises a plurality of panel portions intersecting one another approximately at a right angle to cover the surface segment substantially in intimate contact therewith. The facing members are identical in three-dimensional configration.

The fastening means for attaching the facing members to the respective surface segments are made common in construction to render the plurality of facing members interchangeable in the position of attachment. Various known means are usable as the fastening means. For example, each fastening means comprises the combination of a screw provided on the facing member and a threaded bore formed in the cabinet, or lock means provided by a pair of elastic engageable portions formed respectively on the cabinet and the facing member which are made of resin.

As a result, the plurality of facing members are interchangeable freely in the position of attachment to the cabinet. For example, when the facing members are prepared in different colors and replaced by one another and attached to the cabinet in the interchanged positions, the user can enjoy the arrangement of colors on the device with a sense of play.

The facing members cover the body of the device and form no sharp projection unlike the conventional removable panel structure. This ensures safety when the device is used by infants.

To divide the surface of the cabinet into the plurality of surface segments, ribs extend along the boundaries between the segments. This renders the facing members easy to position on the surface segments as specified.

The exterior structure of the present invention is usable for the cabinets of speaker portions provided on opposite sides of cassette tape playback devices, cabinets for sound clocks which notify the time with a sound, telephone cabinets, cabinets for portable radio receivers and cabinets of various other devices.

BRIEF DESCRIPTION OF THE DRAWINGS

FIGS. 1 to 5 show a first embodiment of the invention as applied to a stereo cassette tape playback device;

FIG. 1 is a perspective view showing facing members as removed from cabinets;

FIG. 2 is a perspective view showing the facing members as attached to the cabinets;

FIG. 3 is a front view of a speaker portion with facing members attached thereto;

FIG. 4 is an enlarged view in section taken along the line A—A' in FIG. 3;

FIG. 5 is a view showing a fastening screw attaching structure;

FIG. 7 is a perspective view showing facing members as removed from a cabinet;

FIG. 8 is a perspective view showing the facing members as attached to the cabinet;

FIG. 11 is a perspective view showing facing members as removed from a cabinet;

FIG. 12 is a perspective view showing the facing members as attached to the cabinet;

FIG. 13 is a perspective view showing the device of FIG. 12 with its closure opened;

FIG. 14 is a sectional view showing means for locking the facing member to the cabinet;

FIG. 15 is a perspective view showing facing members as removed from a cabinet;

FIG. 16 is a perspective view showing the facing members as attached to the cabinet.

DETAILED DESCRIPTION OF EMBODIMENTS

Embodiments of the invention will be described below in detail with reference to the drawings.

First Embodiment

Figure 1:
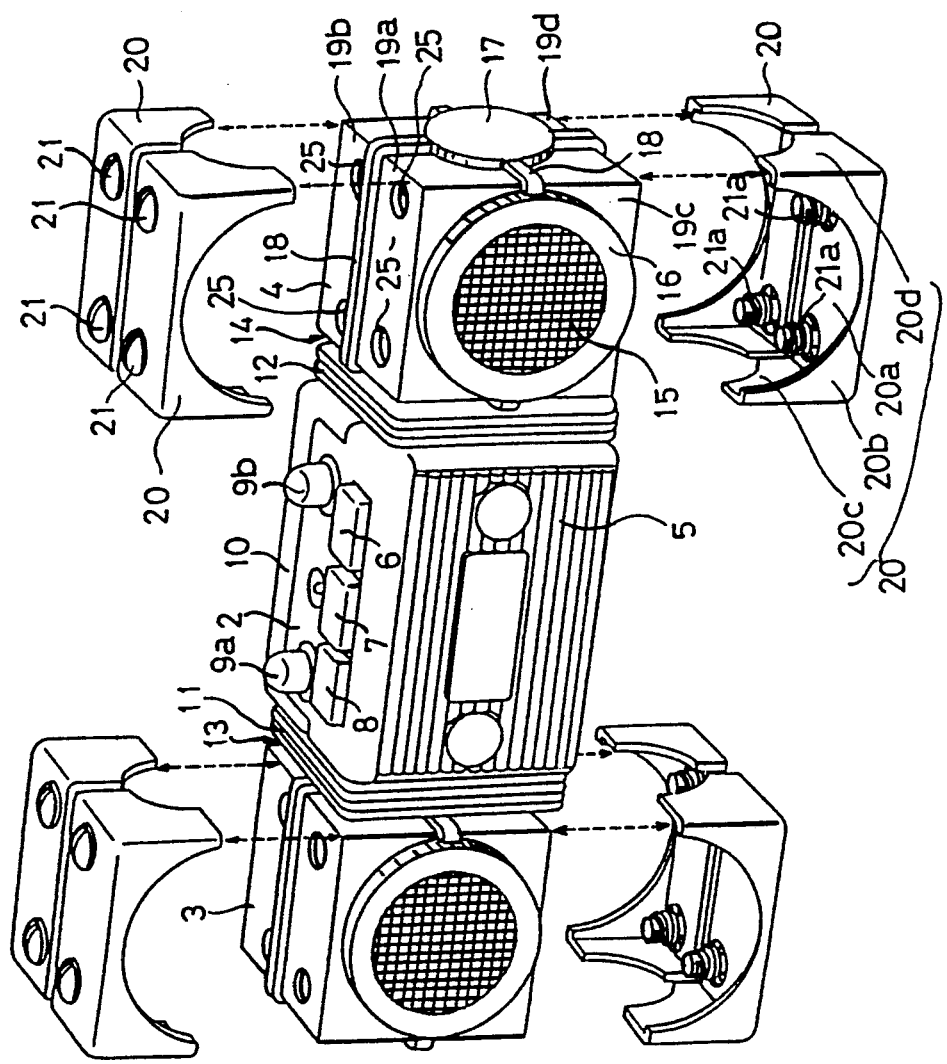
Figure 2:
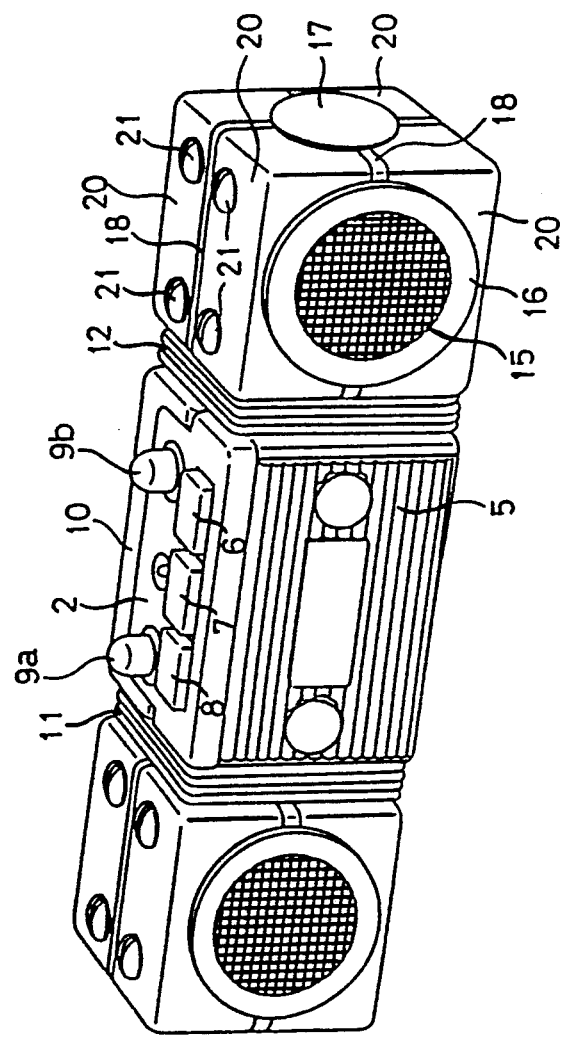

This embodiment is an exterior structure of the invention for a stereo cassette tape playback device as shown in FIGS. 1 and 2. The device comprises a central cabinet 2 housing recording-reproduction means, etc. for a cassette tape, and a pair of rectangular parallelopipedal speaker cabinets 3, 4 housing a right-channel speaker and a left-channel speaker, respectively, and connected to opposite sides of the central cabinet 2.

The central cabinet 2 has an openable closure 5 on its front side for closing a tape cassette accommodating portion, and a play button 6, fast-forward button 7, stop button 8 and volume and other control knobs 9a, 9b on its top. The cabinet 2 has pivoted thereto a handle 10 for use in carrying the device.

Partition members 11, 12 are integrally formed with the central cabinet 2 on opposite sides thereof. Clearances 13, 14 for permitting insertion of the facing member to be described below from outside thereinto are formed respectively between the partition members 11, 12 and the speaker cabinets 3, 4 (see FIG. 3).

The side speaker cabinets 3, 4 are shaped symmetrically with respect to the central cabinet 2. A description will be given of the speaker cabinet 4 on the right side shown. A first annular rib 16 surrounding a circular speaker sound output portion 15 is formed on the front side of the cabinet 4 centrally thereof. A second annular rib (not shown) having the same shape as the first annular rib is formed on the rear side of the cabinet centrally thereof.

The speaker cabinet 4 is further formed with a first disk rib 17 on its outer side and a second disk rib 17a shaped identically with the rib 17 on its inner side providing the clearance 14 as seen in FIG. 3. The second disk rib 17a is joined directly to the partition member 12 of the central cabinet 2.

The speaker cabinet 4 further has a plurality of linear ribs 18 interconnecting the annular ribs 16 and the disk ribs 17, 17a as seen in FIGS. 1 and 2. The four regions surrounded by these ribs 16, 17, 17a and 18 are surface segments 19a, 19b, 19c and 19d which are to be covered with the facing members to be described below. These surface segments each extend over four cabinet faces intersecting one another at a right angle and are shaped identically with one another.

A facing member 20 molded integrally of soft resin and shaped to cover each of the surface segments 19a to 19d in its entirety is removably attached to the surface segment. The facing member 20 comprises first to fourth panel portions 20a, 20b, 20c and 20d fittable to the respective four faces of the surface segment generally in intimate contact therewith. The corners where the panel portions butt against one another are curved with a suitable curvature. The four facing members are identical in configuration. Further the four facing members 20 are different from one another in color. (For example, they are colored in red, blue, yellow and green.) The four facing members can be made different in pattern.

Each facing member 20 has a pair of fastening screws 21, 21 attached to its first panel portion 20a and prevented from slipping off. More specifically stated with reference to FIGS. 4 and 5, the first panel portion 20a of the facing member 20 is formed with screw holes 22, and a plurality of retaining pieces 24 extend inward from the inner periphery defining each of the holes 22. The fastening screw 21 has a threaded portion 21a, and a flange 21b provided between this portion 21a and its head. The flange 21b has a diameter greater than the outside diameter of the threaded portion 21a and is slightly larger than the central opening defined by the tips of the retaining pieces 24. Accordingly, the fastening screw 21 can be held to the facing member 20 rotatably against slipping off by inserting the flange 21b through the central opening utilizing the elasticity of the retaining pieces 24 and causing the retaining pieces 24 to engage with the shank 21c of the screw 21 between the head and the flange 21b. The head of the screw 21 has a groove serving as a portion for rotating the screw.

On the other hand, the speaker cabinet 4 is formed with a pair of screw bores 25, 25 for the threaded portions 21a of the two screws 21 on each facing member 20 to fit in, the bores 25 being positioned in corresponding relation with the respective screws 21.

The speaker cabinet 3 on the left side shown in FIG. 1 is also provided with the same exterior structure as above which comprises surface segments and facing members.

Accordingly, eight facing members 20 can be removably attached to the speaker cabinets 3, 4 as shown in FIGS. 1 and 2 by fitting these facing members 20 to the respective surface segments 19a, 19b, 19c, 19d of the cabinets 3, 4 and driving the fastening screws 21 on the facing members 20 into the respective screw bores 25 in the speaker cabinets with a coin or specific driver fitted in the head groove of each screw 21. At this time, the panel portions 20c of the facing members positioned closer to the central cabinet 2 are inserted into the corresponding clearance 13 or 14 between the central cabinet 2 and the speaker cabinet 3 or 4, with the end face of each facing member 20 bearing on the corresponding rib 16, 17, 17a or 18 on the cabinet 3 or 4, whereby the inner surface of each facing member is brought into substantially intimate contact with the outer surface of the speaker cabinet.

The eight facing members 20 thus attached to the cabinets 3, 4 can be removed from the cabinets 3, 4 after loosening the fastening screws 21, replaced by one another and attached to the respective surface segments of the speaker cabinets again in interchanged positions. Consequently, the opposite speakers have a color pattern or arrangement different from the previous one to assume an altered aesthetic appearance.

Second Embodiment

Figure 6:
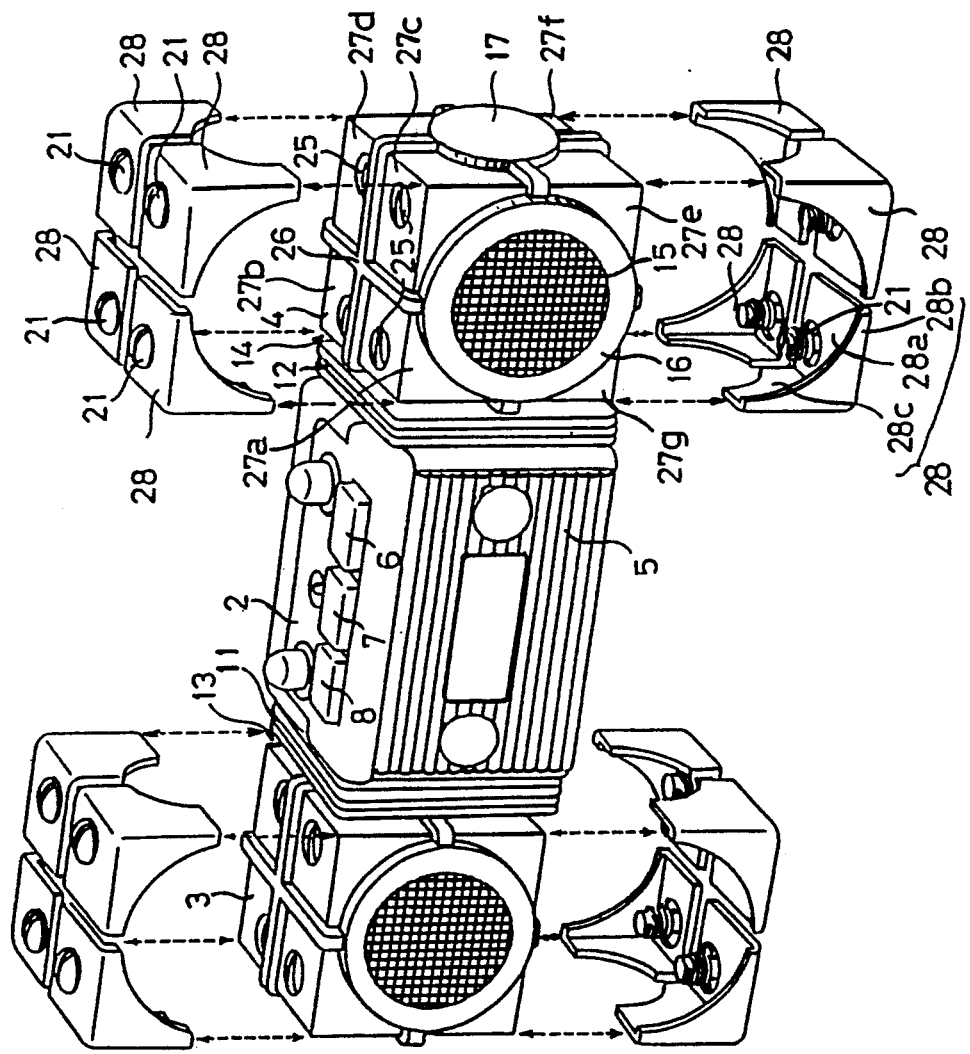
FIG. 6 is a perspective view showing a second embodiment of the invention as applied to a stereo cassette tape playback device.

With reference to FIG. 6, this embodiment has eight surface segments on the surface of each of speaker cabinets 3, 4 of a cassette tape playback device.

The embodiment will be described with reference to the speaker cabinet 4 on the right side. The cabinet is formed on its surface with annular ribs 16, disk ribs 17 and a plurality of linear ribs 26 interconnecting these ribs. Of these linear ribs, the two ribs on each of the upper and lower surfaces of the cabinet intersect each other crosswise. These ribs 16, 17, 18 surround eight regions which are surface segments 27a, 27b, 27c, 27d, 27e, 27f, 27g (the eighth segment can not be seen in FIG. 6). Each of these surface segments extends over three cabinet faces intersecting one another at a right angle. The segments are shaped identically with one another.

Each of facing members 28 comprises first to third panel portions 28a, 28b and 28c substantially intimately fittable to three surface segments. The corners where the panel portions butt against one another are each formed with a curved surface with a suitable curvature. The eight facing members 28 are identical in configuration but are different from one another in color and have fastening screws 21 attached thereto.

The exterior structure described above enables the user to enjoy a wider variety of color patterns than is the case with the first embodiment.

Third Embodiment

Figure 7:
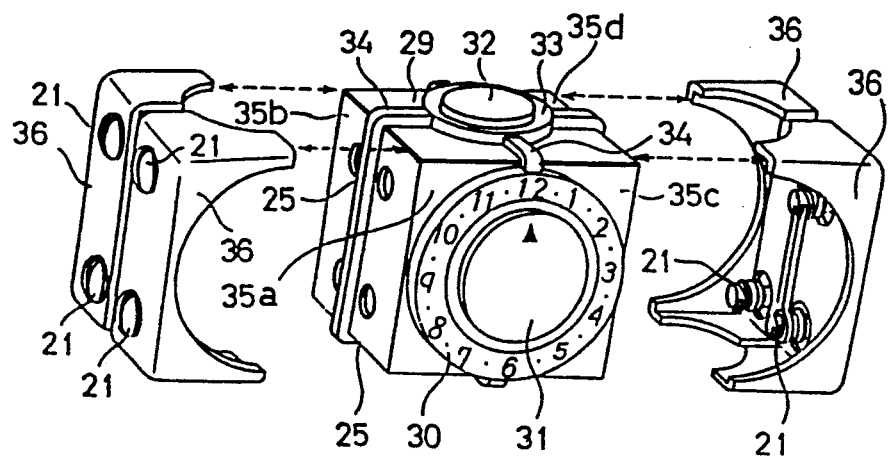
FIGS. 7 and 8 show a third embodiment of the invention as applied to a sound clock.
Figure 8:
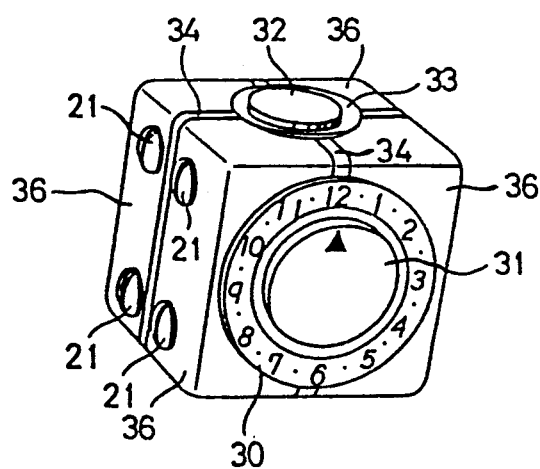

This embodiment is adapted for use with a sound clock as seen in FIGS. 7 and 8. A cabinet 29 housing clock means and sound generating means is generally cubic in external shape. The front side of the cabinet 29 is centrally formed with a first annular rib 30 marked with time graduations, and an alarm setting dial 31 inside the rib 30. A second annular rib (not shown) shaped identically with the first annular rib 30 is formed on the rear side of the cabinet.

Provided on the top side of the cabinet 29 are a first disk rib 33 and a push button 32 inside the rib 33 to be depressed when a time notifying sound is to be produced. Formed on the bottom side of the cabinet is a second disk rib (not shown) identical with the first disk rib in shape.

The cabinet 29 further has a plurality of linear ribs 34 interconnecting the annular and disk ribs 30, 33. These ribs 30, 33, 34 surround four regions which provide surface segments 35a, 35b, 35c, 35d of an identical shape.

Facing members 36 have exactly the same construction as the facing members 20 of the first embodiment shown in FIG. 1, are removably attached to the respective surface segments and can be replaced by one another for attachment in interchanged positions to give an altered color pattern.

Fourth Embodiment

Figure 9:
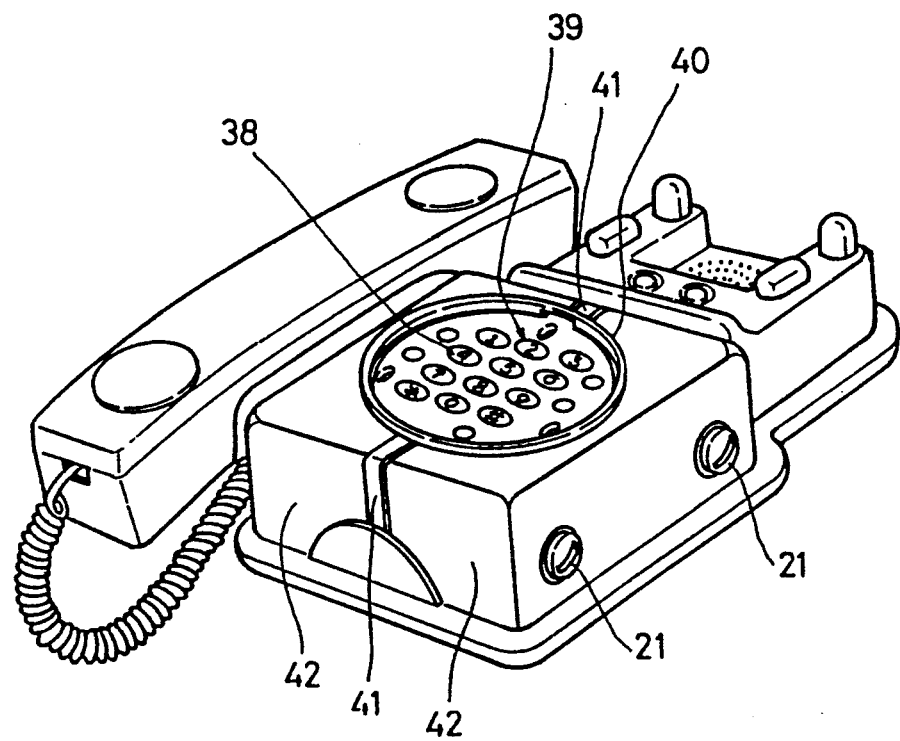
FIG. 9 is a perspective view showing a fourth embodiment of the invention as applied to a telephone.

As shown in FIG. 9, exactly the same exterior structure as the above embodiment can be used for telephones.

The telephone cabinet is formed on its top side with an annular rib 40 around a circular operation panel 39 which is provided with a plurality of dial push buttons 38. On opposite sides of the annular rib 40 and linear ribs 41, 41 extending forward and rearward from the rib 40, a pair of facing members 42, 42 having the same construction as those of the first or third embodiment are removably attached to the cabinet.

The two facing members 42, 42 can be replaced by each other to give a different appearance to the telephone.

Fifth Embodiment

Figure 10:
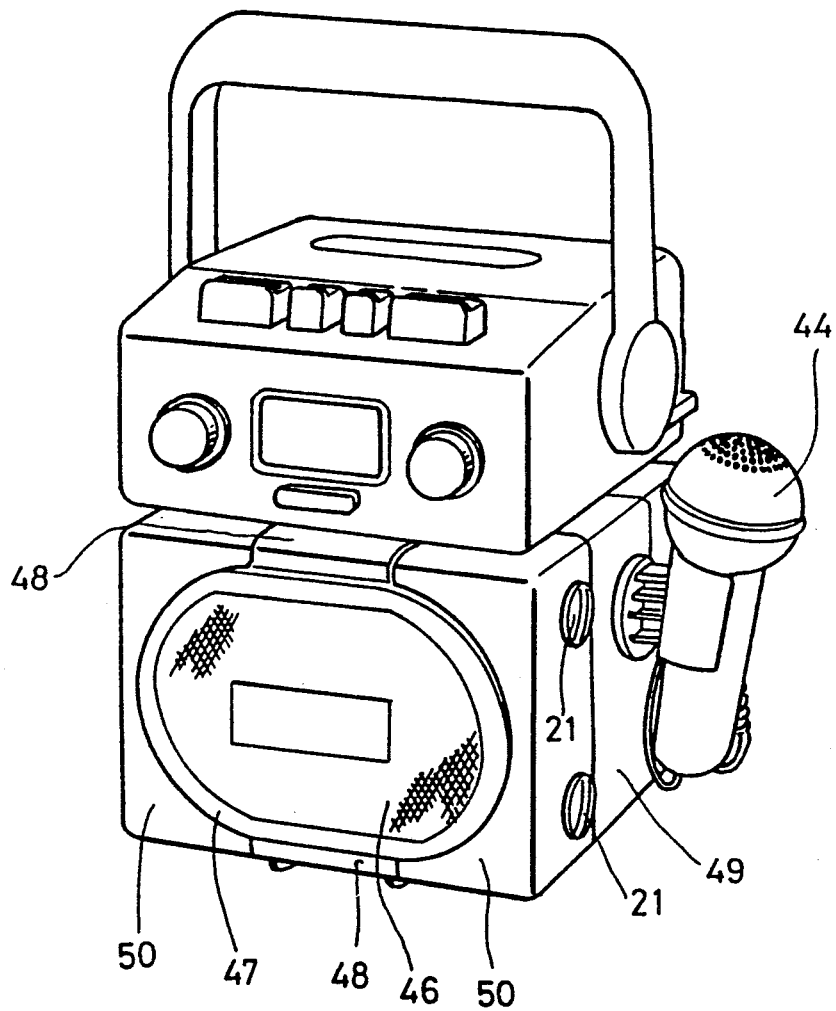
FIG. 10 is a perspective view showing a fifth embodiment of the invention as applied to a cassette tape playback device having a sound mixing function.

FIG. 10 shows a cassette tape playback device for an infant to enjoy singing to the accompaniment of playback of a cassette tape. The device has the function of mixing the input voice signal from a microphone 44 connected to the device body with the signal reproduced from the cassette tape to produce a sound from its speaker.

An exterior structure similar to the foregoing embodiments is used also for the device. The device has a lower cabinet housing the speaker. The cabinet has a first elliptical rib 47 formed on its front side and extending around a speaker sound output portion 46, a second elliptical rib (not shown) identical with the first rib 47 in shape and formed on the cabinet rear side, first strip ribs 48, 48 extending from these elliptical ribs to the top and bottom sides of the cabinet, and second strip ribs 49 extending vertically on opposite side walls of the cabinet to the top and bottom sides thereof. Four facing members 50 identical in configuration are removably attached to the respective four regions surrounded by the ribs.

Sixth Embodiment

Figure 11:
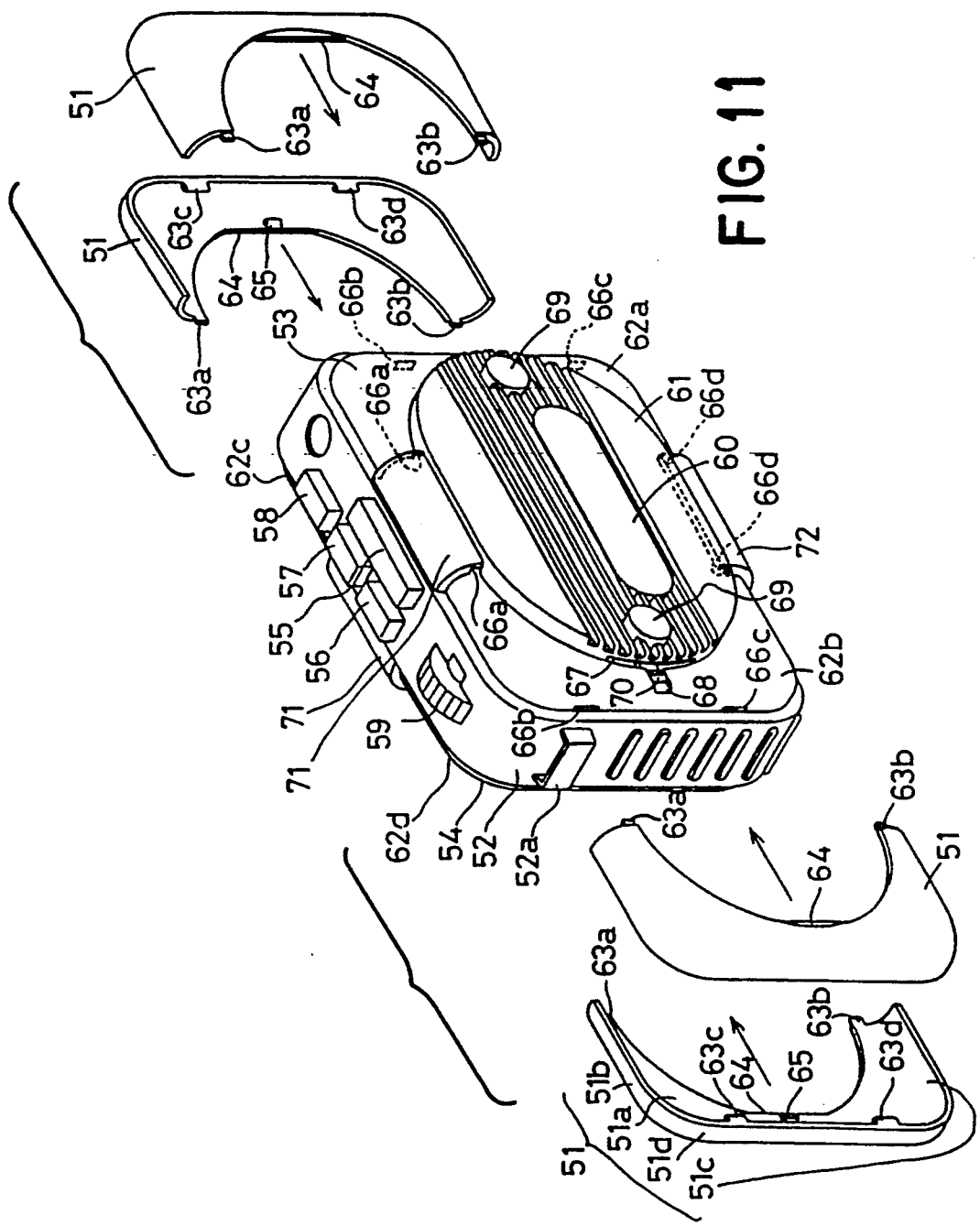
FIGS. 11 to 14 show a sixth embodiment of the invention as applied to a portable cassette tape playback device.
Figure 12:
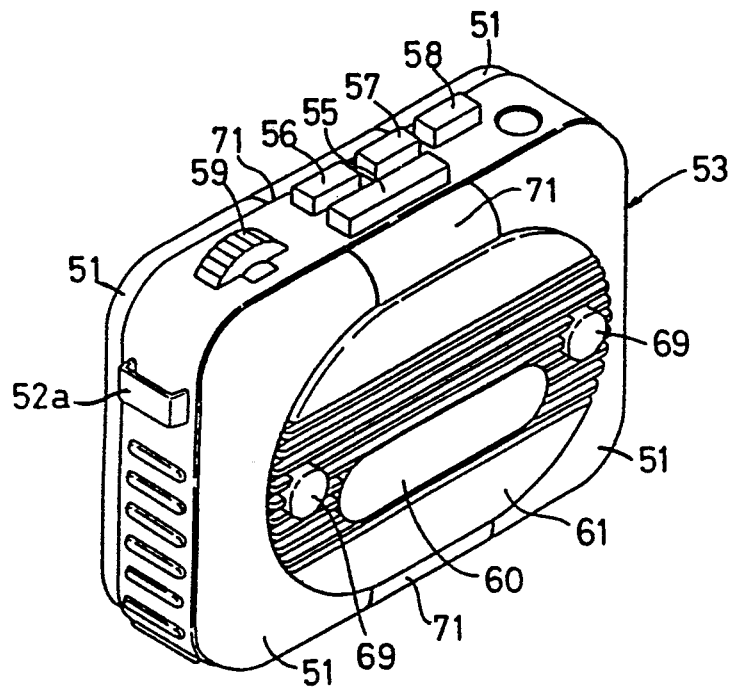
Figure 13:
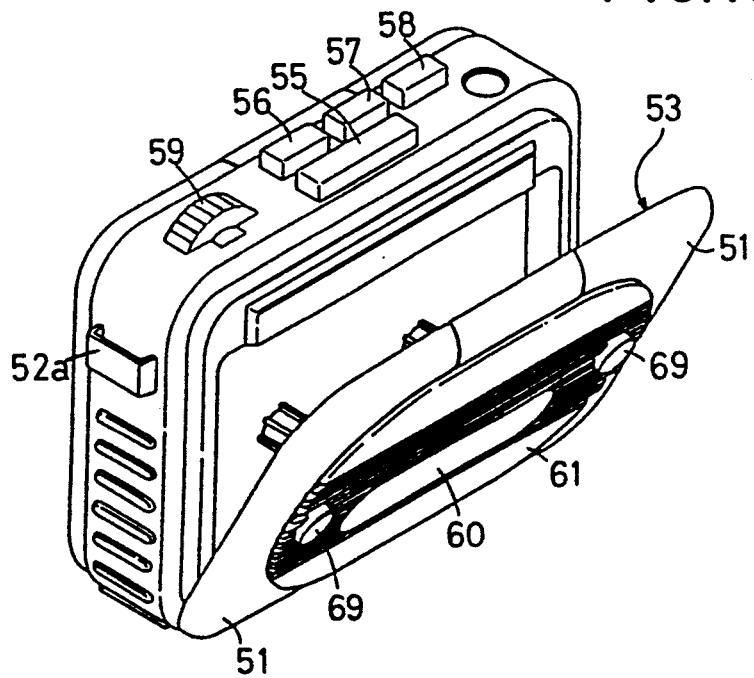

With reference to FIGS. 11 to 13, this embodiment comprises facing members 51 which are different in configuration from those of the above embodiments and which are removably attached to the cabinet 52 of a portable compact cassette, tape playback device.

The cabinet 52 is in the form of a flat rectangular parallelopiped and has a front panel 53 and a back panel 54 which have an area in conformity with the size of the tape cassette to be used. The front panel 53 is openable to serve as a closure for loading and unloading the cassette. The cabinet 52 has on its top side a play button 55, fast-forward button 56, rewind button 57, stop button 58 and volume control knob 59. The cabinet has an earphone jack (not shown) and a belt attaching member 52a at its side portions.

The front panel 53 has an elliptical first projection 61 which is centrally formed with a transparent window 60 for the user to recognize the presence or absence of the tape cassette. The back panel 54 is also formed with a second projection identical with the first projection in shape. Each of the front and back panels 53, 54 is further formed with strip ribs 71, 72 extending upward and downward from the projection.

Consequently, the two panels 53, 54 are formed on their surfaces with four surface segments 62a, 62b, 62c and 62d at opposite sides of the projections and the ribs. Each of these segments has a U-shaped planar region extending in parallel to the cabinet face having the projection, and a curved region continuous with the planar region along its outer periphery. The four surface segments are identical in configuration. The corner of the cabinet 52 along its top, bottom and lateral sides thereof around the outer periphery of each surface segment 62a, 62b, 62c or 62d is recessed by a dimension slightly larger than the thickness of the ribs 71, 72 as seen in FIG. 11.

A facing member 51 integrally molded of soft resin is removably attached to each of the surface segments 62a to 62d. The facing member 51 comprises a first panel portion 51a substantially intimately fittable to the planar region of the surface segment, and second to fourth panel portions 51b, 51c, 51d so curved as to substantially intimately fit to the curved region of the segment. The four facing members 51 are identical in configuration but are different from one another in color. These facing members can be marked with different patterns.

The first and fourth panel portions 51a and 51d of the facing member 51 have first and second lugs 63a, 63b, and third and fourth lugs 63c, 63d, respectively, projecting from their ends toward the direction of insertion of the facing member relative to the cabinet. The first panel portion 51a centrally has a thin plate portion 64 which is formed with a hook 65 projecting from its inner surface.

On the other hand, each of the front panel 53 and the back panel 54 is formed with first to fourth slits 66a, 66b, 66c, 66d for the respective first to fourth lugs 63a to 63d of each facing member 51 to fit in, and with a cutout 67 for the thin plate portion 64 to fit in when the facing member 51 is attached to the cabinet. A groove 68 is formed in each panel 53 or 54 in communication with the cutout 67 for the hook 65 on the facing member to fit in.

Figure 14:
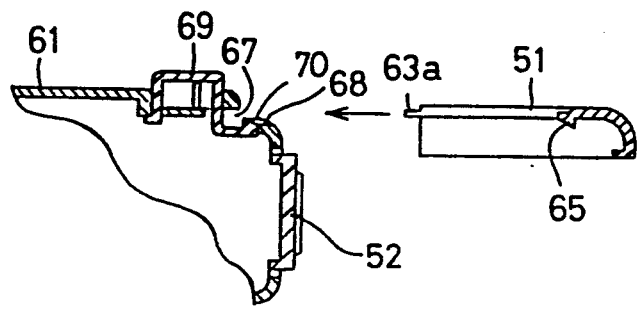

The projection 61 of the front panel 53 is provided with a pair of push buttons 69, 69 as elastically supported at the respective ends of the projection and each having its head exposed for manipulation. Projecting from the push button 69 is a claw 70 engageable with the hook 65 of the facing member as seen in FIG. 14. The claw 70 is retracted into the groove 68 when the push button 69 is depressed.

The back panel 54 of the cabinet 52 is also provided with the same push buttons and claws (not shown) as above.

When each facing member 51 is to be attached to the cabinet 52, the lugs 63a to 63d of the facing member 51 are inserted into the respective slits 66a to 66d in the cabinet as indicated by an arrow in FIG. 11, and the facing member 51 further pushed in the direction of insertion. In this step, the hook 65 of the member 51 depresses the head of the claw 70 on the cabinet through a cam action, elastically deforming the push button 69, and is eventually engaged with the claw 70 while permitting the push button 69 to elastically return to its projected position. Consequently, the facing member 51 is unseparably attached to the cabinet 52 as shown in FIG. 12.

The two facing members 51, 51 attached to the front panel 53 opens and closes the tape loaded portion along with the front panel 53 as shown in FIGS. 12 and 13.

Each facing member 51 can be removed from the cabinet 52 by depressing the push button 69 to release the hook 65 from the claw 70 and withdrawing the facing member 51 from the cabinet 52 in this state. Thus, the facing member is easily removable from the cabinet.

The four facing members 51 removed from the cabinet 52 can be attached to the respective surface segments 62a to 62d again in desired interchanged positions.

Seventh Embodiment

Figure 16:
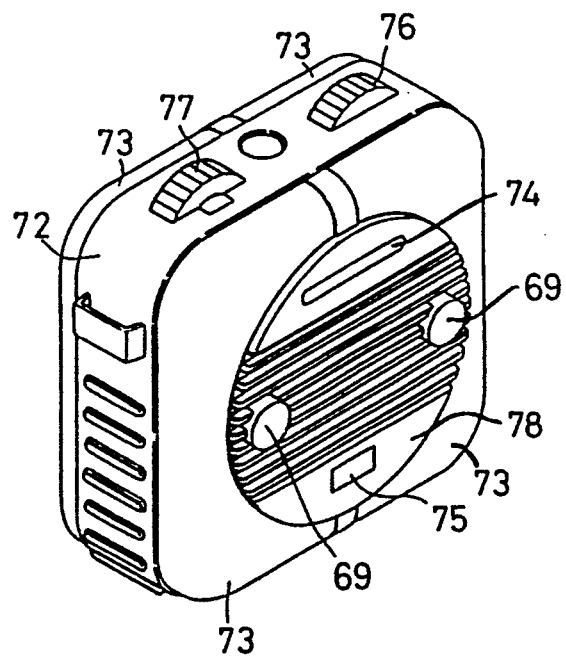
FIGS. 15 and 16 show a seventh embodiment of the invention as applied to a portable radio receiver.
Figure 15:
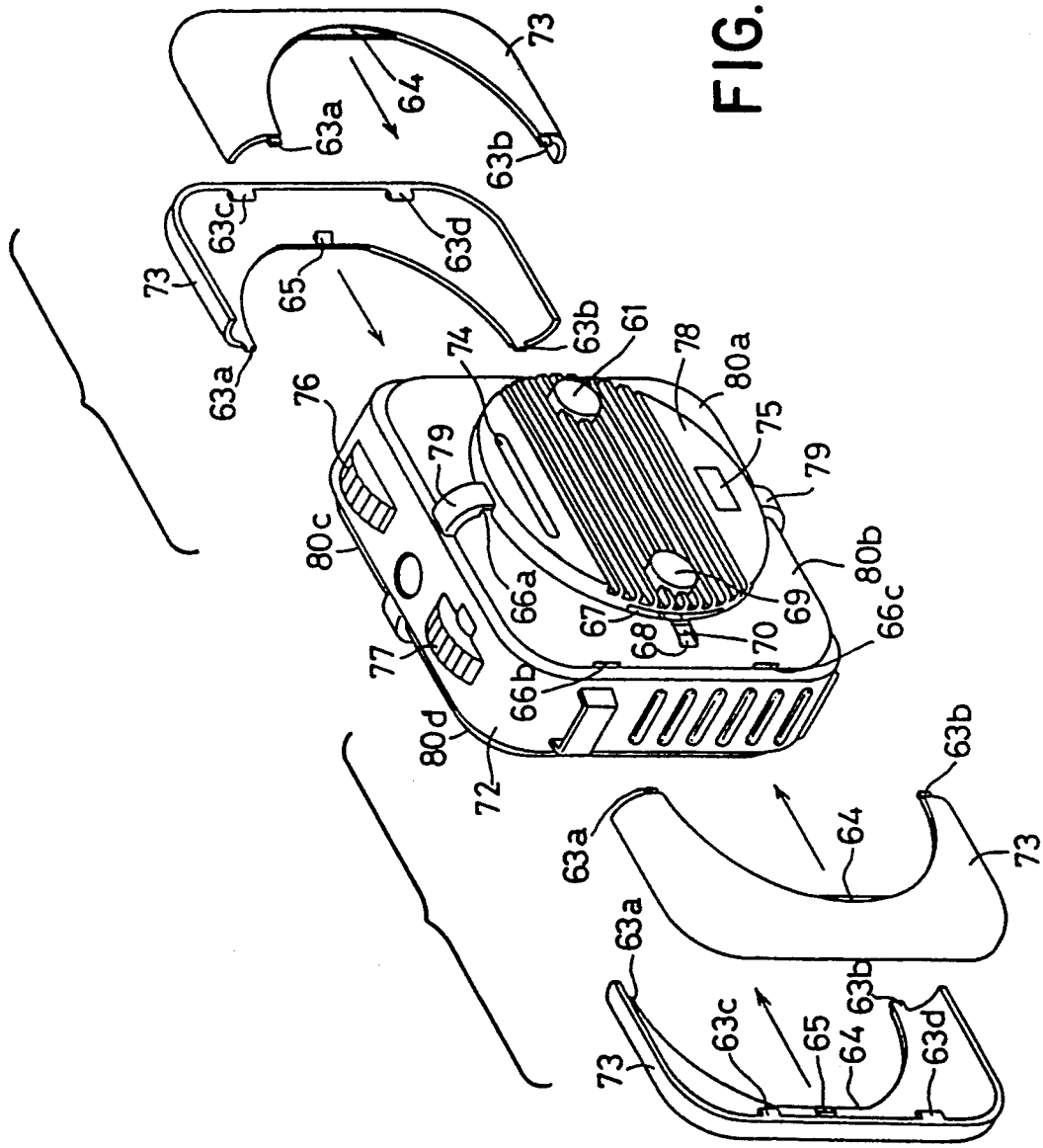
Figure 17:
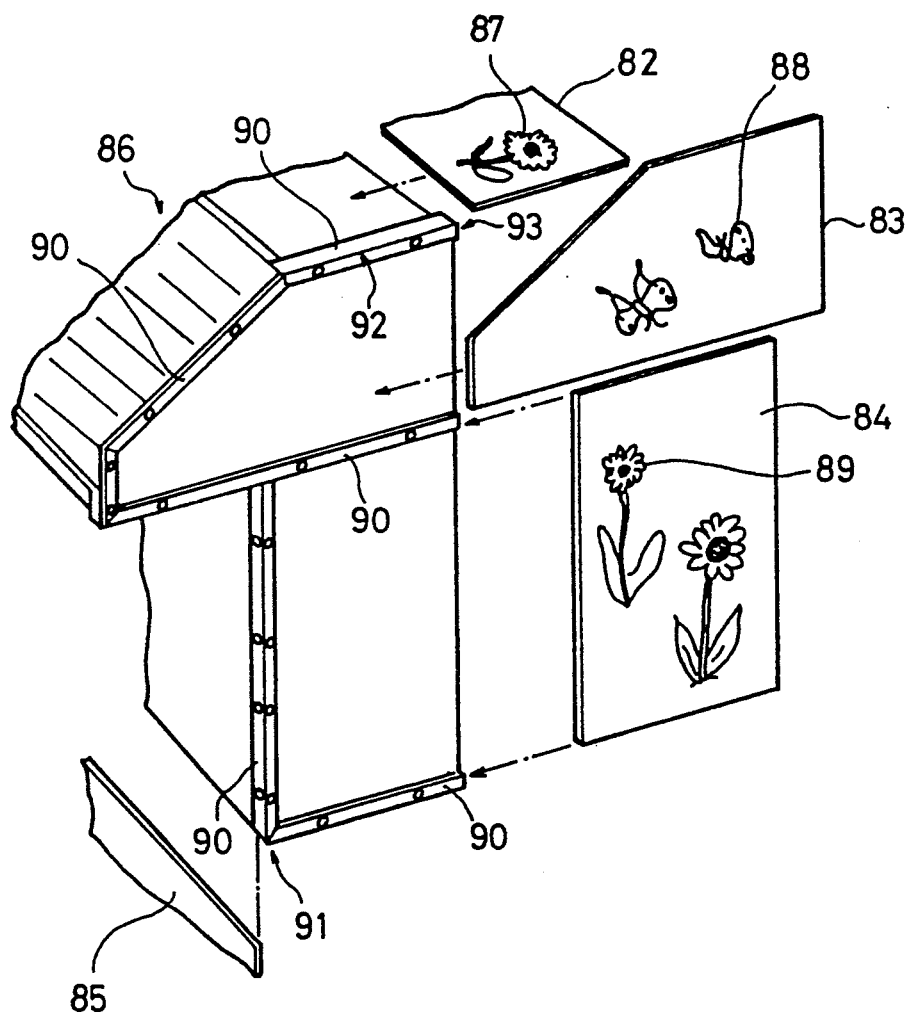
FIG. 17 is an exploded perspective view showing a conventional panel structure.

With reference to FIGS. 15 and 16, the same exterior structure as the above embodiment can be used also for a portable radio receiver.

The cabinet 72 of the receiver is provided on its top side with a tuning dial 76 for adjusting the receiver to the received frequency and a volume control dial 77. The front side of the cabinet 72 is provided with a circular first projection 78 and ribs 79, 79 extending upward and downward from the projection. The projection 78 has a tuning indicator 74 for indicating the received frequency and a time display 75. A second projection (not shown) identical with the first projection in shape is formed on the rear side of the cabinet. Consequently, the cabinet has four surface segments 80a, 80b, 80c and 80d which are identical in shape to those of the sixth embodiment.

The four facing members 73 to be attached to the surface segments have the same configuration as those of the sixth embodiment and are different from one another in color. Furthermore, the means for locking the facing member to the cabinet 72 has exactly the same construction as the means included in the sixth embodiment, so that throughout the drawings showing the sixth and seventh embodiments, like parts are designated by like reference numerals or symbols and will not be described again.

With any of the foregoing embodiments, a plurality of facing members which are different from one another in color are attached to the respective surface segments formed on the cabinet of the contemplated device interchangeably in the position of attachment, so that especially when the device is used by infants, the device can be handled with the same sense as when dressing up dolls or building blocks for the infant to enjoy a wide variety of color patterns or arrangements.

Since the facing members have corners which are rounded with a smooth curved surface, the device having the facing members attached thereto is rounded in its entirety and has no external sharp corners. The facing members which are made of soft resin obviate the likelihood that the device will cause injuries when handled by infants, hence safety.

The cabinet has the ribs dividing its surface into segments, so that each facing member can be pressed against the rib and thereby positioned in place easily before it is attached to the surface segment.

The exterior structure can be made usable in common for different kinds of devices as is the case with the first, third, fourth and fifth embodiments, or with the sixth and seventh embodiments. This makes it possible to interchange the facing members between these devices for the user to enjoy a wide variety of colors on a system comprising such devices in combination, further contributing a great deal to a manufacturing cost reduction.

With the first to fifth embodiments, the fastening screws are prevented from slipping off and therefore will not become lost even when the device is handled by infants. Further according to the sixth and seventh embodiments, even the infant can readily interchange the facing members by depressing the push buttons and pushing each facing member into the cabinet.

The exterior structure of the present invention is not limited to the foregoing embodiments but can of course be modified variously by one skilled in the art without departing from the scope of the invention as defined in the appended claims.

For example, the number of surface segments on the cabinet is not limited to those used in the embodiments but can be any desired number.

What is claimed is:

1. An exterior structure for a closed cabinet, the exterior structure comprising:

a plurality of surface segments and rib members forming the outer surface faces of the cabinet, said plurality of surface segments having a similar or symmetrical configuration, said rib members extending between adjacent said surface segments;

a plurality of facing members for removably covering said surface segments substantially in contact therewith; and fastening means for removably attaching each of said facing members to said surface segments, each of said surface segments extending over a plurality of the cabinet outer surface faces forming corners of the cabinet, each of said facing members having a plurality of panel portions corresponding to respective cabinet outer surface faces which form the corners of the cabinet, each of said facing members being identical in configuration and interchangeable with each other relative to the position of attachment to said surface segments.

2. An exterior structure as defined in claim 1, wherein corners of the facing member where the panel portions thereof butt against one another are each formed with a smooth curved surface.

3. An exterior structure as defined in claim 1, wherein an outer surface of the cabinet is formed with surface segments and to be in bearing contact with an end face of each facing member.

4. An exterior structure as defined in claim 1, wherein the fastening means comprises a screw rotatably held to the facing member against slipping off, a screw bore formed in the cabinet for the screw to be screwed in and a rotating portion formed in the screw.

5. An exterior structure as defined in claim 1, wherein the cabinet includes each of a pair of opposite speaker cabinets of a stereo cassette tape playback device, and the outer surface of each speaker cabinet has a plurality of surface segments over the region thereof other than the speaker sound output portion and the portion of connection between the speaker cabinet and the body of the device to be loaded with a cassette tape.

6. An exterior structure as defined in claim 1 wherein the cabinet is the cabinet of a sound clock for telling the time with a sound when a push button is depressed and has a plurality of surface segments over the outer surface thereof other than the regions where the push button and an alarm setting dial are provided.

7. An exterior structure as defined in claim 1 wherein the cabinet is the cabinet of a telephone and has a plurality of surface segments over the outer surface thereof other than the region where an operation panel having push buttons is provided.

8. An exterior structure as defined in claim 1 wherein the cabinet is the speaker cabinet of a cassette tape playback device having a sound mixing function and is formed with a plurality of surface segments over the outer surface thereof other than the speaker sound output portion and the portion of connection between the speaker cabinet and the body of the device to be loaded with a tape cassette.

9. An exterior structure having portions with surface features different from surface features of other portions of the exterior structure for a closed cabinet which has a plurality of outer faces and a plurality of corners formed by the outer cabinet faces, the exterior structure comprising:

a plurality of surface segments and rib members formed over the outer faces of the cabinet, said surface segments extending over a plurality of the outer cabinet faces and corners and having similar or symmetrical configuration, said rib members extending between adjacent said surface segments;

a plurality of facing members adapted for covering and inter-engaging with said surface segments, each of said facing members being identical in shape to all other facing members and similar in shape to said surface segments; and fastening means for inter-engaging said facing members with said surface segments.

* * * * *